(12) United States Patent
Hoole

(10) Patent No.: US 11,394,309 B2
(45) Date of Patent: Jul. 19, 2022

(54) VOLTAGE DOUBLING AC POWER SUPPLY USING ELECTRICITY FROM TWO CIRCUITS WITH TRANSFORMER FOR PHASE CONTROL AND INPUT CIRCUIT ISOLATION

(71) Applicant: Duane Warren Hoole, Phoenix, AZ (US)

(72) Inventor: Duane Warren Hoole, Phoenix, AZ (US)

( * ) Notice: Subject to any disclaimer, the term of this patent is extended or adjusted under 35 U.S.C. 154(b) by 340 days.

(21) Appl. No.: 16/126,239

(22) Filed: Sep. 10, 2018

(65) Prior Publication Data
US 2019/0028037 A1 Jan. 24, 2019

Related U.S. Application Data

(63) Continuation-in-part of application No. 14/859,666, filed on Sep. 21, 2015, now Pat. No. 10,075,087.

(51) Int. Cl.
*H02M 5/12* (2006.01)

(52) U.S. Cl.
CPC ..................... *H02M 5/12* (2013.01)

(58) Field of Classification Search
CPC ............ H02M 5/02; H02M 5/04; H02M 5/06; H02M 5/10; H02M 5/12; H02M 5/14; H02M 5/22; H02M 5/25; H02M 5/257; H02M 5/275; H02M 5/293; H02M 5/2932; H02J 3/12; H02J 3/04; H02J 3/38; H02J 3/381
See application file for complete search history.

(56) References Cited

U.S. PATENT DOCUMENTS

| | | | | |
|---|---|---|---|---|
| 3,648,059 A * | 3/1972 | Beaudry | ............... | H02H 11/002 307/127 |
| 5,160,852 A * | 11/1992 | Charles | ..................... | G05F 1/59 307/77 |
| 5,245,219 A * | 9/1993 | Romatzick, Jr. | ........ | H02H 11/00 307/71 |
| 5,666,278 A * | 9/1997 | Ng | .......................... | H02M 7/49 363/71 |
| 5,808,454 A * | 9/1998 | Chung | ..................... | G05F 1/66 323/255 |

(Continued)

*Primary Examiner* — Gustavo A Rosario-Benitez
(74) *Attorney, Agent, or Firm* — Arno Naeckel

(57) ABSTRACT

An alternating current power supply configured to provide a high-voltage alternating current power output from two or more low-voltage alternating current power sources is provided. The alternating current power supply comprises a first alternating current power input, a second alternating current power input, and an alternating current power output having a first output conductor and a second output conductor. The alternating current power supply includes a first switch means for coupling the first alternating current input to the first output connector and the second alternating current input to the second output connector. The first switch means is sequentially responsive to the first current flow followed by the second current flow. The alternating current power supply further comprises an isolation means connected between the first switch means and the alternating current power output, wherein the isolation means is configured to isolate the first current flow from the second current flow.

16 Claims, 4 Drawing Sheets

(56) References Cited

U.S. PATENT DOCUMENTS

| | | | | |
|---|---|---|---|---|
| 5,936,828 A * | 8/1999 | Nolan | H02H 11/00 | 361/167 |
| 5,977,658 A * | 11/1999 | Hoole | H02M 5/02 | 307/19 |
| 6,087,818 A * | 7/2000 | Hughes | H01F 27/022 | 323/301 |
| 2003/0151413 A1* | 8/2003 | Elms | G01R 31/1272 | 324/541 |
| 2004/0070278 A1* | 4/2004 | Divan | H02J 3/0073 | 307/64 |
| 2004/0164716 A1* | 8/2004 | Walter | H02M 5/22 | 322/8 |
| 2009/0046402 A1* | 2/2009 | Malkus | H01R 25/003 | 361/87 |
| 2010/0039090 A1* | 2/2010 | Sykes | H02M 5/12 | 323/301 |
| 2013/0201733 A1* | 8/2013 | Divan | H02M 1/00 | 363/39 |
| 2015/0365003 A1* | 12/2015 | Sadwick | H02M 3/28 | 363/21.01 |
| 2018/0157284 A1* | 6/2018 | Ewing | H04L 43/0876 | |
| 2019/0363573 A1* | 11/2019 | Le | H02J 9/061 | |

* cited by examiner

VOLTAGE DOUBLING AC POWER SUPPLY USING ELECTRICITY FROM TWO CIRCUITS WITH TRANSFORMER FOR PHASE CONTROL AND INPUT CIRCUIT ISOLATION

RELATED CASES

This application claims the benefit of priority under 35 U.S.C. § 119(e) based upon commonly-owned U.S. patent application Ser. No. 15/657,183 filed on Sep. 21, 2015, which claims priority from U.S. provisional patent application 62/056,340, filed Sep. 26, 2014. Both applications are herein incorporated by reference in their entirety.

TECHNICAL FIELD

The present invention relates to electric power supplies and, more specifically, to an alternating current power supply configured to provide a high-voltage alternating current power output from at least a first low-voltage alternating current power source and a second low-voltage alternating current power source. The first low-voltage alternating current power source and a second low-voltage alternating current power source may be of the same or different phase. Commercial power sources may comprise a Split Phase System providing 240 v power or a Three Phase Wye System providing 208 v power instead of 240 v.

BACKGROUND

In the United States, most electrical receptacles in residences and other consumer facilities are 120-volt receptacles (also commonly referred to as 110 volt receptacles). Certain types of equipment, however, require 240-volt power for their operation. For example, larger power tools, pumps and air conditioners often require 240-volt power (also commonly referred to as 220 volt power). While 240-volt circuits and receptacles can be wired from the 240-volt distribution lines connected to the secondary winding of the distribution transformer, such circuits are usually installed only for specified, permanently installed equipment. They are not generally available for temporary or emergency use without the installation of new branch electrical circuits within the facility. It is often necessary or desirable to have 240-volt power even though a permanent 240-volt outlet is not available, such as during construction, for equipment evaluations, or for short-term manufacturing operations. To obtain access to 240-volt power in the absence of a permanent 240-volt outlet, one previously has had to install a new 240-volt circuit and outlet, which takes significant time and expense.

Further, many 120-volt receptacles include Ground Fault Interrupters ("GFI"). A GFI will open the supply circuit if the current on the supply lead (the "hot") differed from the current on the corresponding neutral lead.

Accordingly, an object of this disclosure is to provide a safe, convenient and quick connection to 240-volt line voltage distribution conductors of a facility's distribution transformer at the full amperage capacity through two or three readily available, standard 120-volt receptacles (with or without GFIs), thereby accessing the full nominal 240 volts of the secondary winding of the distribution transformer and providing approximately 4800 watts of power. The subject matter described herein can be used with a 120-volt, high amperage generator to produce a power supply of 240-volts at 20 amps. In an exemplary application, the power supply disclosed herein may be linked to Honda 3000 generators.

A further object of this disclosure is to provide a means to change the polarity of a distribution transformer output(s) thereby combining the outputs of the same phase to achieve a 240-volt power supply.

A further object of this disclosure is to provide an apparatus and method by which one can use 240 (or higher) volt equipment on a temporary or emergency basis where a 240-volt receptacle is not available, eliminating the time delay and expense of installing a new 240-volt circuit.

A further object of this disclosure is to provide a means by which one can use 208, 240 (or higher) volt equipment on a temporary or emergency basis where a 240-volt receptacle is not available, eliminating the time delay and expense of installing a new 208 or 240-volt circuit by using power inputs comprising same or different phases of a three phase 120-volt source, with or without a GFI.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

BRIEF SUMMARY

To achieve the forgoing objects, and in accordance with the subject matter described below, an alternating current power supply is provided that is configured to provide a high-voltage alternating current power output from a first low-voltage alternating current power source providing a first voltage with a first current flow and a second low-voltage alternating current power source providing a second voltage with a second current flow. The alternating current power supply comprises a first input means for coupling the alternating current power supply to the first low-voltage alternating current power source, a second input means for coupling the alternating current power supply to the second low-voltage alternating current power source, and an output means for providing the high-voltage power output. The output means comprises a first output conductor and a second output conductor, wherein the first input means is coupled to the first output conductor by a first voltage controlled relay switch and the second input means is coupled to the second output conductor by a second voltage controlled relay switch. The alternating current power supply further comprises an isolation means generating an isolation output voltage, the isolation means being configured to isolate the first current flow from the second current flow, the isolation means being located between the output means for providing the high-voltage power output and both of the first current controlled relay switch and the second current controlled relay switch.

Also according to the subject matter described herein below, an alternating current power supply is provided that is configured to provide a high-voltage alternating current power output from a first low-voltage alternating current power source providing a first voltage with a first current flow and a second low-voltage alternating current power source providing a second voltage with a second current flow. The alternating current power supply comprises a first alternating current power input, a second alternating current power input, an alternating current power output having a first output conductor and a second output conductor, and a first switch means for coupling the first alternating current input to the first output connector and the second alternating current input to the second output connector. The first switch means being sequentially responsive to the first current flow followed by the second current flow. The alternating current power supply further comprises an isolation means connected between the first switch means and the alternating current power output, wherein the isolation means is configured to isolate the first current flow from the second current flow.

A method for providing a high-voltage alternating current source from a first low-voltage alternating current power source that produces a first voltage, and a second low-voltage alternating current power source that produces a second voltage is provided. The method comprises the steps of providing an alternating current power supply comprising a first power supply input, a second power supply input, a first control terminal, a second control terminal, a transformer, and a power supply output having a first output conductor and a second output conductor, the first output conductor and the second output conductor being isolated from the first power supply input and the second power supply input. The method then provides for 1) coupling the first alternating current power source to the first power supply input, 2) coupling the second power supply input to the transformer by a first voltage sensing relay that senses the first voltage, 3) coupling the second alternating current power source to the second power supply input, 4) fourth, coupling the first power supply input to the first output conductor by a second voltage sensing relay sensing the second voltage, and 5) simultaneously coupling the first power supply input and the second power supply input to the power supply output in response to a voltage across the first control terminal and the second control terminal.

BRIEF DESCRIPTION OF THE DRAWINGS

The accompanying drawings, which are incorporated in and constitute part of the specification, illustrate a presently preferred embodiment(s) and method(s) of the invention, together with the general description given above and the detailed description of the invention given below, serve to explain the principles of the invention.

DETAILED DESCRIPTION

Figure 1:
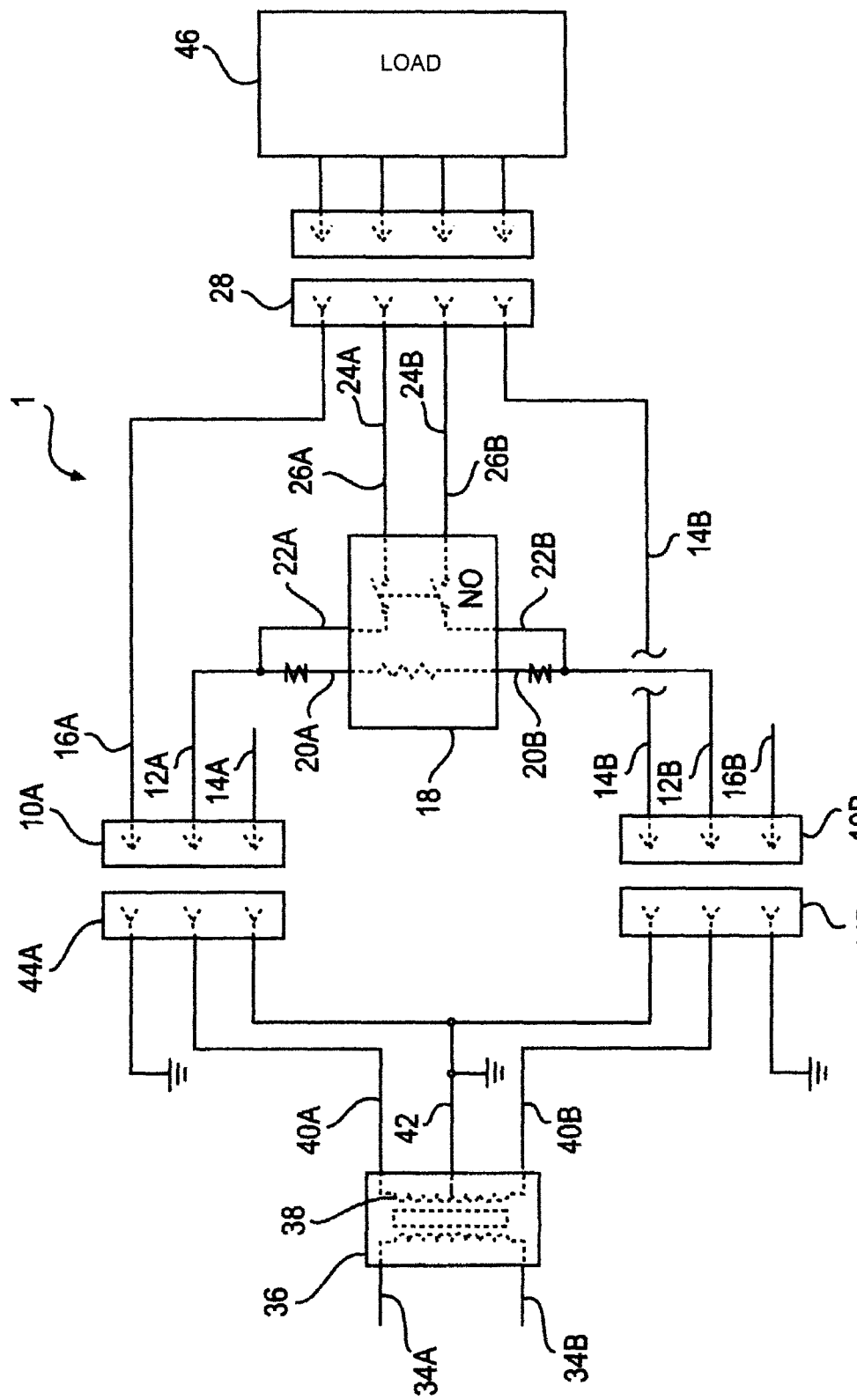
FIG. 1 depicts a prior art power supply configured to deliver 240-volt AC power from two, 120-volt AC sources of the same phase or that are 180° out of phase.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. Process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment will be presented in the following detailed description of the invention, it should be appreciated that a number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Reference will now be made in detail to the invention as illustrated in the accompanying drawings, in which like reference characters designate like or corresponding parts throughout the drawings.

FIG. 1 depicts a prior art alternating current power supply 1 consistent with that described in U.S. Pat. No. 5,977,658, which is incorporated herein by reference it its entirety. A first lower voltage input means includes a standard 120-volt AC male three prong electrical plug 10A used for commercial or residential appliances. The first input plug 10A is connected to a first three-wire cable having a first line voltage conductor 12A, a first common conductor 14A, and a first grounding conductor 16A. Similarly, a second 120-volt AC male input plug 10B is connected to a second three-wire cable having a second line voltage conductor 12B, a second common conductor 14B, and a second grounding conductor 16B. The first line voltage conductor 12A is connected to a double-pole electrically controlled switching device 18 at a first control terminal 20A and at a first power input terminal 22A. Similarly, the second line voltage conductor 12B is connected to the switching device 18 at a second control terminal 20B and at a second power input terminal 22B.

Still referring to FIG. 1, a first power output terminal 26A of the device 18 is connected by a first output conductor 24A to an input terminal of an electrical load 46 via an output receptacle 28. A second power output terminal 26B of the switching device 18 is connected by a second output conductor 24B to a second input terminal of the electrical load 46 via the output receptacle 28. Electrical grounding is supplied by connecting either a first grounding conductor 16A or a second grounding conductor 16B (which are connected to input plugs 10A and 10B, respectively) to output receptacle 28. For safety reasons, it is preferable that only one of the grounding conductors 16A or 16B be connected to the output receptacle 28. If a common conductor is required for the electrical load, one, but not both, of the common conductors 14A and 14B (which are connected at one end to input plugs 10A and 10B, respectively) is connected to an appropriate terminal of the electrical load 46 via optional output receptacle 28.

The alternating current power supply 1 may include means for adjusting the activation voltage at which the double-pole electrically controlled switching device 18 activates and deactivates. A first voltage control element 30A may be placed between the first line voltage conductor 12A and the first control terminal 20A. A second voltage control element 30B may be placed between the second line voltage conductor 12B and the second control terminal 20B. In this configuration a user avoids activating the switch device 18 when one of the first or second input voltage conductors 12A, 12B is inadvertently connected through input plugs 10A or 10B to a ground or common conductor in a miswired receptacle. When such a miswiring exists, only 120 volts will be produced between the first and second output conductors 24A and 24B, which can potentially damage equipment designed to operate on a nominal 240-volt input. The voltage control elements 30A and 30B can be resistors, diodes or any other circuitry for controlling the voltage or current at the control terminals 20A and 20B in response to the voltage on the line voltage conductors 12A and 12B. The voltage control elements 30A and 30B need not be identical.

In typical power systems, electrical power is distributed from the generating source (not shown) by means of high voltage transmission lines 34A, 34B. The voltage of the electrical power is reduced to a level suitable for consumer use with a distribution transformer 36. The full output voltage of the distribution transformer 36, which may be a single or split phase system, is developed across the electrical ends of secondary winding 38 and is accessed through connections to a first line voltage distribution conductor 40A and to a second line voltage distribution conductor 40B, as shown.

The prior art power supply of FIG. 1 will operate with only a single phase, or with two phases of a three phase wye alternating current electrical power source as typically supplied by a public utility or a source with similar electrical characteristics. The full secondary output of the illustrated single phase transformer 38 is nominally referred to as 240 volts. However, the full output voltage of distribution transformer 36 may vary and may fall within a broad range due to system design and electrical load variations.

The distribution transformer 36 typically also has a connection to a common distribution conductor 42 at the electrical center of the secondary winding 38. Voltage developed on the secondary winding 38 between the first line voltage distribution conductor 40A and the electrical center of the secondary winding 38 is one half the full voltage of the secondary winding 38, nominally 120 volts. Likewise, voltage developed on the secondary winding 38 between the second line voltage distribution conductor 40B and the electrical center of the secondary winding 38 is also one half the full voltage of the secondary winding 38, nominally 120 volts. Thus, from the secondary winding 38 there are three possible output connections for electrical power: (1) the first line voltage distribution conductor 40A and the second line voltage distribution conductor 40B, for 240 volts a first line voltage conductor 12A and 20A, producing 4800 w, (2) the first line voltage distribution conductor 40A and the common distribution conductor 42, for 120 volts, and (3) the second line voltage distribution conductor 40B and the common distribution conductor 42, for 120 volts and 20A, producing 2400 w. Although combinations (2) and (3) both produce 120 volts, their alternating current phase will differ by 180 degrees.

Still referring to FIG. 1, most electrical receptacles in residences and other consumer facilities are 120-volt receptacles. Such receptacles are connected to either first line voltage distribution conductor 40A or 40B and to the common distribution conductor 42. Receptacles wired for 240 volt power from the line voltage distribution conductors 40A and 40B typically are placed only for specified, permanently installed equipment and are not generally available to temporary or emergency use without the installation of new branch electrical circuits within the facility. The person desiring to use equipment requiring 240 volts connects the first input plug 10A to any 120-volt receptacle, such as the first 120-volt receptacle 44A. Next, the user connects the second input plug 10B to another 120-volt receptacle in the area. If that receptacle is wired to the second line voltage distribution conductor 40B, such as the second receptacle 44B, the voltage between line voltage conductors 12A and 12B will be the full 240 volts supplied by secondary winding 38 of distribution transformer 36. The 240 volts is thus supplied to control terminals 20A and 20B of the switching device 18, closing both poles of the switching device. Electrical power is then conducted through the first line voltage conductor 12A, the first power input terminal 22A, one pole of said switching device 18, the first power output terminal 26A, the first output conductor 24A, the optional output receptacle 28, and to the electrical load 46. Concurrently, the other side of the electrical circuit is completed through the second line voltage conductor 12B, power input terminal 22B, the second pole of said switching device 18, power output terminal 26B, output conductor 24B, optional output receptacle 28, and to the electrical load 46.

During operation of the prior art power supply 1, all of the supplied current travels through the first line voltage conductor 12A and back through the second line voltage conductor 12B, or vice versa. The current traveling through the common conductors (14A, 14B) is essentially zero. Because of the differences in current flow through a line voltage conductor and its corresponding common conductor, a receptacle equipped with a GFI could not be used because the GFI would always trip.

If, the user proceeds as in the previous paragraph, but connects the second input plug 10B to another 120-volt receptacle (not shown) that is wired to the same end of secondary winding 38 of distribution transformer 36 as is first receptacle 44A, the resulting voltage between line voltage conductors 12A and 12B and, hence, control terminals 20A and 20B will be zero. The switching device 18 will not close, and the line voltage conductors 12A and 12B will remain electrically isolated from output conductors 24A and 24B. Similarly, if there is line voltage on either of conductor 24A or 24B, but not on the other, switching device 18 will not close, and the line voltage conductors 12A and 12B will remain electrically isolated from output conductors 24A and 24B. This open circuit separating the output conductors from the low voltage power sources is a key feature of the prior art power supply of FIG. 1. Power is isolated from the output receptacle 28 and the electrical load 46 until input plugs 10A and 10B are properly connected to appropriate 120-volt conductors that are either in phase or that are 180 degrees out of phase, thereby producing the desired 240-volt output.

If the user encounters the situation described in the previous paragraph, i.e., the switching device 18 has not closed and no power is being supplied to either the output receptacle 28 or the electrical load 46, the user simply unplugs the first input plug 10A from the receptacle, and plugs it into another receptacle. When the correct connection is achieved, i.e. when a receptacle connected to the first distribution conductor 40A is found, such as receptacle 44A, the switching device 18 closes and power is supplied to the output receptacle 28 and/or the electrical load 46. The above-described prior art provides connection to line voltage distribution conductors 40A and 40B through standard 120-volt receptacles 44A and 44B where the phase of the power at the receptacles is the same, thereby accessing the full nominal 240 volts of secondary winding 38. However, none of the receptacles can be equipped with a GFI because they will always trip.

Figure 2:
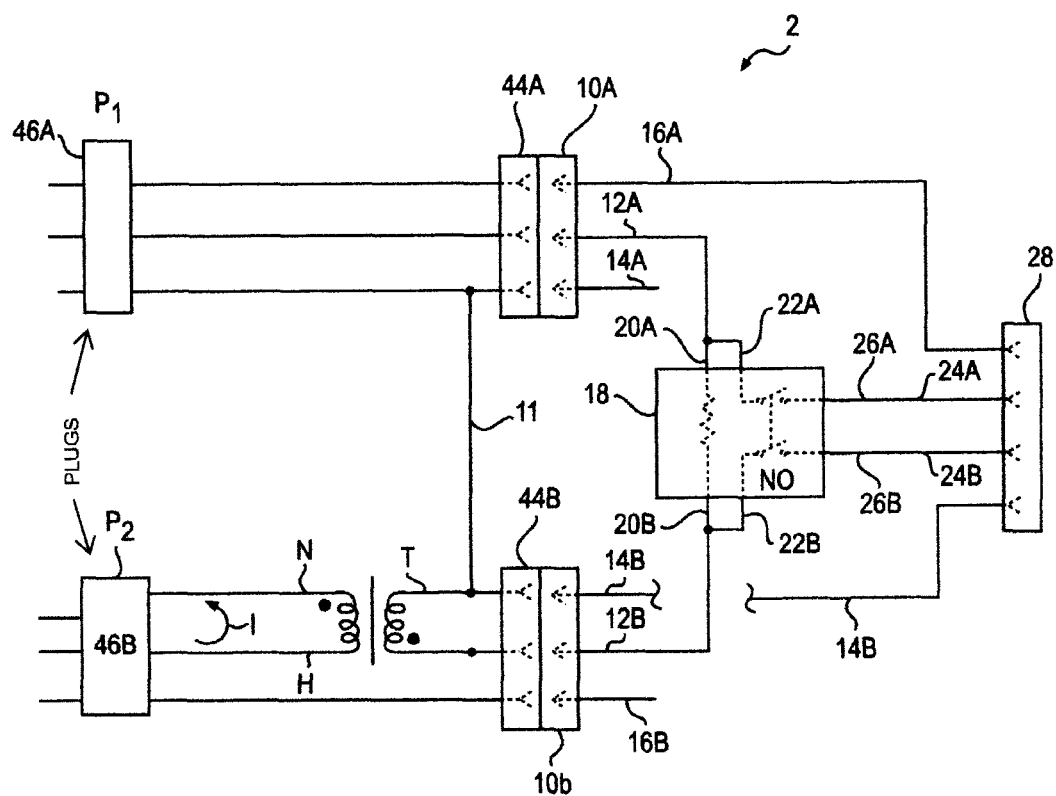
FIG. 2 depicts a second prior art power supply based on FIG. 1 featuring a transformer appended to the input of the prior art power supply.

FIG. 2 is another prior art alternating current power supply 2 that modifies the prior art alternating current power supply 1 by merely appending an isolation transformer proximate to the input plugs 10A and 10B. The prior art of FIG. 2 calls for a joining 11 of the neutral leg 14A with the output of the transformer T on line voltage conductor 12B at 44B. However, when such a joining 11 is made to resolve the GFI tripping issue as described above, the unplugged plug 46A/46B becomes inadvertently electrified. The inadvertent current path runs either from $P_2$ through the connection/joining 11 to the neutral 14A, or it travels through line voltage conductor 12B, switch 18, to the line voltage conductor 12A, or both. Therefore, inclusion of the transformer T at the location described in FIG. 2 cures the GFI tripping issue but causes a significant risk of circuit failure or injury.

Figure 3:
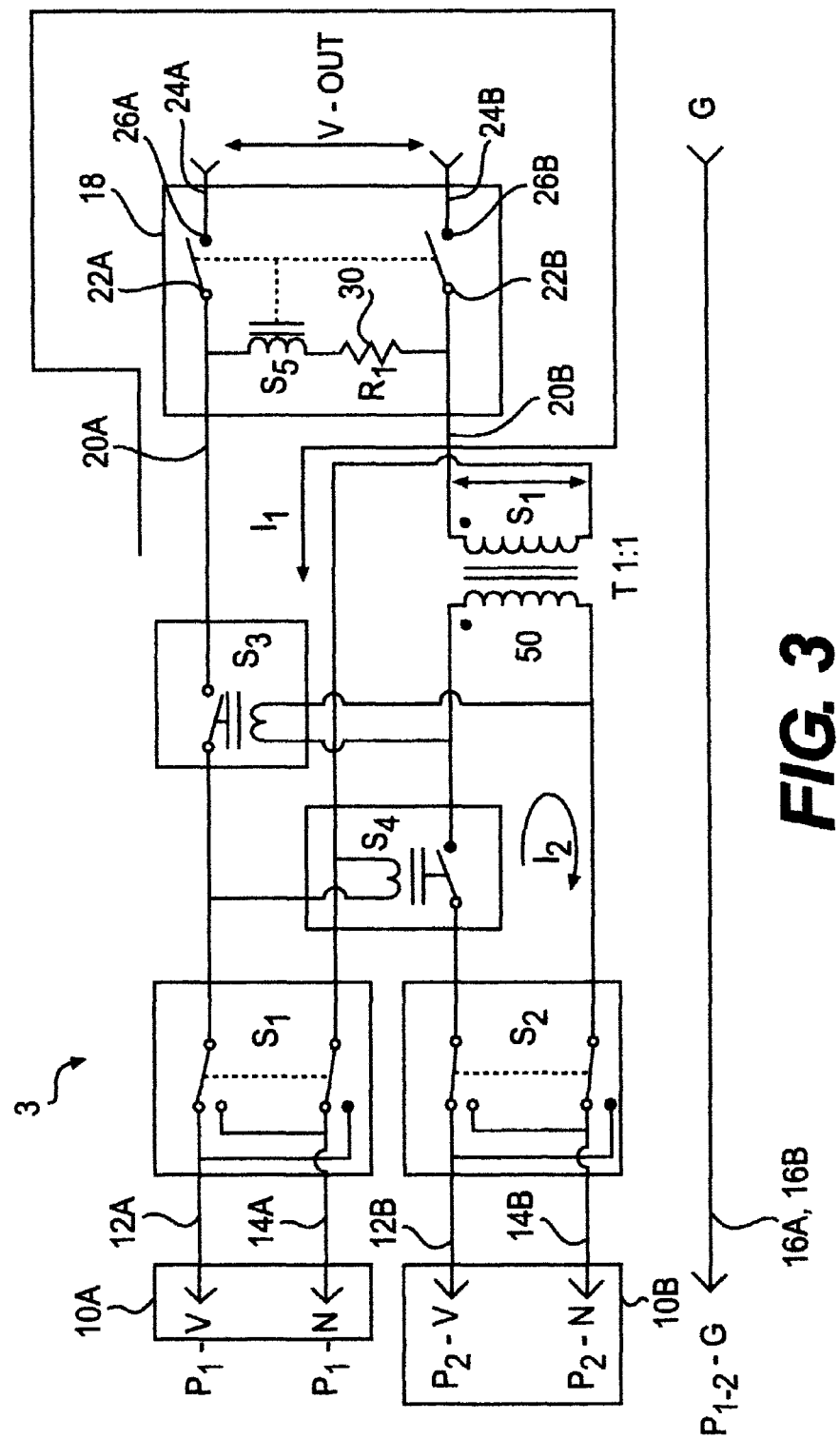
FIG. 3 depicts an exemplary embodiment of an AC power supply including the novel subject matter disclosed herein.

FIG. 3 depicts an exemplary alternating current power supply 3 in accordance with inventive subject matter described herein below that automatically provides either 208 volt alternating current power, where the first low-voltage power source and the second low-voltage power source are feeding power from distribution transformers outputting different phases of a three phase wye power source (240 v (sin 120°)), or provides 240 volt alternating current power, where the first low-voltage power source and the second low-voltage power source are in phase. The circuit of FIG. 3 is similar to that of prior art FIG. 1 wherein like component indicators indicate like components. However, the alternating current power supply 3 of FIG. 3 may use low voltage receptacles equipped with a GFI, where the prior art alternating current power supply 1 cannot, and does not suffer from the imperfections described above in regard to the prior art alternating current power supply of FIG. 2.

As described above in regard to FIG. 1, the first low voltage input means includes a standard 120-volt AC male three prong electrical plug 10A used for commercial or residential appliances. The first input plug 10A is connected to the first three-wire cable having a first line voltage conductor 12A, the first common conductor 14A, and the first grounding conductor 16A. Similarly, the second low-voltage input means is a 120-volt AC male input plug 10B (see, FIG. 1) that is connected to a second three-wire cable including the second line voltage conductor 12B, the second common conductor 14B, and the second grounding conductor 16B. The first line voltage conductor 12A is connected to a double-pole electrically controlled switching device 18 at the first power input terminal 22A. Similarly, the second line voltage conductor 12B is connected to the switching device 18 at the second power input terminal 22B.

Still referring to FIG. 3, electrical grounding is supplied by connecting either the first grounding conductor 16A or a second grounding conductor 16B to the external ground via the input plugs 10A/10B (see FIG. 1). For safety reasons, it is preferable that only one grounding connector be connected to the output receptacle 28 (see, FIG. 1).

The alternating current power supply 3 may include means for adjusting the activation voltage at which the double-pole electrically controlled switching device 18 activates and deactivates. This adjusting means may be voltage control element 30 placed in series with a relay coil S5. Relay S5 shuts switch 18 when the voltage between the first power output terminal 26A and the second power output terminal 26B reaches a minimum value (e.g., 200 v). In this configuration the voltage control element 30 trims the activation voltage for the relay coil S5 and avoids activating the switch device 18 when one of the first or second input voltage conductors (12A, 12B) is inadvertently connected to a ground or common conductor in a miswired receptacle. The voltage control element 30 can comprise resistors, diodes or any other circuitry for controlling the voltage or current at the control terminals 20A and 20B in response to the voltage on the line voltage conductors 12A and 12B.

The alternating current power supply 3 includes an isolation transformer T. The isolation transformer T may have a 1:1 winding ratio between its primary winding 50 and its secondary winding 51. The isolation transformer T generates an isolation output voltage $V_I$ and isolates the current flow $I_1$ of the first power source from the current flow $I_2$ of the second power source, thereby ensuring that the current flowing through the "hot" lead 12A is equal to the current flowing back through the corresponding common lead 14A to within the sensitivity of a GFI circuit. And, that the current flowing through the "hot" lead 12B is equal to the current flow back through the common lead 14B. Hence, any GFI monitoring of the first low-voltage power source or the second low-voltage power source is not tripped thereby shutting down its respective low-voltage power source.

In equivalent embodiments the 1:1 isolation transformer T may be replaced by a different type of isolation means. Other, non-limiting examples of isolation means includes a solid state transformer, a solid state current transformer, a Scott-T transformer, a poly-phase transformer or a transformer with other that a 1:1 winding ratio. An example of a solid state transformer is described in U.S. Pat. No. 3,996,462.

The exemplary alternating current power supply 3 also may include interlock relays S3 and S4. Interlock relay S3 connects power source one $P_1$ only when power source $P_2$ provides current. Similarly, interlock relay S4 connects power source two $P_2$ only when power source one $P_1$ provides current. By their arrangement, interlock relays S3 and S4 operate sequentially with relay S4 closing first and relay S3 closing second. In the configuration shown, the interlock relay sensing the voltage from the power supply not feeding the isolation transformer T must close first, thereby preventing any back current flow to the input plug 10A (not shown) that may cause a shock hazard to those handling input plug 10A or cause equipment damage. Plugging input plug 10B into power source $P_2$ first will not close interlock relay S3 or S4.

Further, placing isolation transformer T down current from interlock relays S3 and S4 prevents any induced current generated by the isolation transformer from leaking through interlocking relays S3 and S4 and inadvertently energizing plug 10A. If the isolation transformer T is placed up current from interlock relays S3 and S4, the transformer could be energized first by plugging input plug 10B, thereby risking inadvertently electrifying the whole circuit.

The exemplary alternating current power supply 3 may also include input hot/neutral reversing switches S1 and S2. Hot/neutral reversing switches S1 and S2 are manual switches that allow a user to reverse the input voltage polarity of one or both of power sources P1 and P2. In case of a miswired receptacle, the user may manipulate one or both switches S1 and S2 until a required output voltage is obtained. Hot/neutral reversing switches S1 and S2 may be placed in a number of locations such as before or after the interlack relays S3 and/or S4 and/or S8 or before the primary of the transformer T1.

In operation the user of the alternating current power supply of FIG. 3 desiring to power equipment requiring 240 volts connects the first input plug 10A to any 120-volt receptacle, such as the first 120-volt receptacle 44A of FIG. 1. Next, the user connects the second input plug 10B to another 120-volt receptacle. If that receptacle is wired to the second line voltage distribution connector 40B, such as the second receptacle 44B of FIG. 1, the resulting output voltage would be 240 v comprising two 120 volt sources across winding 38A of the distribution transformer 36. When the output voltage measured across output terminals 26A and 26B is greater than a predetermined voltage set point e.g., 200 volts) for the switching device relay S5, both poles of the switching device 18 shut. Electrical power is then conducted through the first line voltage conductor 12A, the first power input terminal 22A, one pole of said switching device 18, the first power output terminal 26A, through the electrical load through isolation means T and back through common lead 14A. Concurrently, the other side of the electrical connection is completed through the second line voltage conductor 12B, isolation transformer T, and back through common lead 14B. Because the current flowing through the first voltage line conductor 12A is the same as the current flowing through the common lead 14A, any GFI monitoring power source P1 will not trip. The same can be said of P2.

Figure 4:
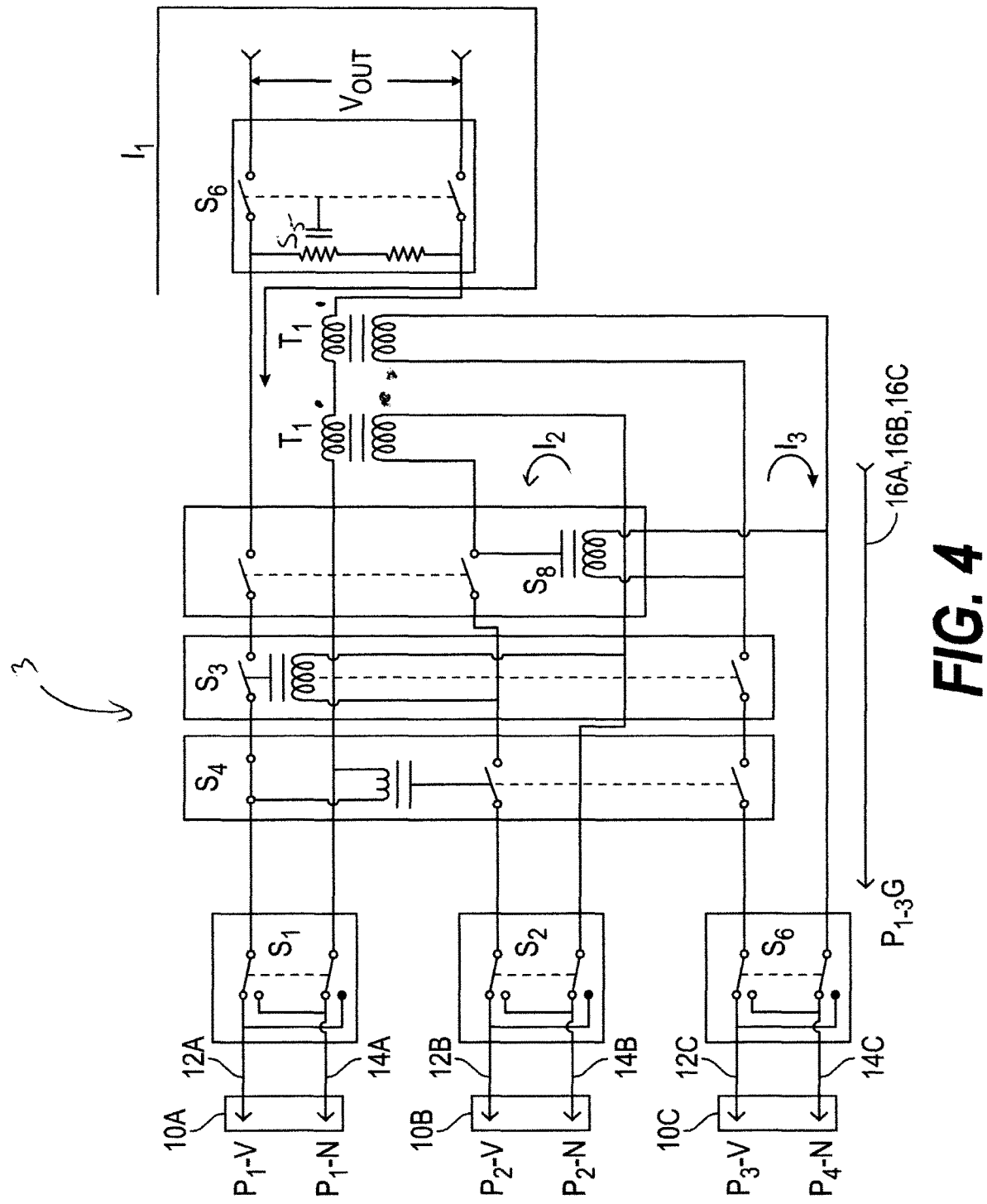
FIG. 4 depicts an exemplary three-phase embodiment of an AC power supply including the novel subject matter disclosed herein.

FIG. 4 is an additional embodiment of an exemplary alternating current power supply 3 in accordance with inventive subject matter described herein below that automatically provides either 208 volt alternating current power, where the first low-voltage power source and the second low-voltage power source are feeding power from distribution transformers outputting different phases of a three phase power source (240 v (sin 120°)), or provides 240 volt alternating current power, where the first low-voltage power source and the second low-voltage power source are in phase. The circuit of FIG. 4 is similar to that of prior art FIG. 1 wherein like component indicators indicate like components.

By using the third phase of available AC power, the power supply can theoretically provide up to 328 VAC, although a lower actual voltage may result due to power loses. In this case the output of phase 1 alone is 120 VAC. When phase 1 and phase 2 are combined by way of transformer T1, output voltage (Vout) is increased to 208 VAC or a factor of 1.73 as described above. When one compares the wave form of the combined phase 1/phase 2 voltage, the resultant wave form is 180 degrees out of phase with the remaining untapped phase 3 120 VAC supply. When one reverse connects transformer T2 sot that is "out of phase" $(-V*-1)$, the resulting Vout of 208 VAC is increased by the full 120 V of phase 3 so that Vout totals 328 VAC.

In the three-input embodiment of FIG. 4, the current demand is determined by whatever load is coupled to Vout plus the very small load of the control circuitry, which may be disregarded as relatively deminimus. Total current at Vout may be controlled or interrupted by inserting an optional circuit breaker or other functionally similar device just upstream of Vout. The current draw from supply phases 2 and 3 are relatively small and are dependent on the equivalent impedance of isolation devices T1 and T2. If conventional 1:1 wound transformers are utilized, these transformer require secondary windings with current capacities which are greater or equal to the highest expected current to the load ($I_1$). If the windings have a primary to secondary winding ratio of other that 1:1, that stepped up or stepped down current should be taken into account. Likewise the output voltage (Vout) may also be adjusted by adjusting the winding ratio.

If a solid state current transformer (SST) is used instead of a traditional wound transformer, the physical bulk and resistive heat generation inherent in wound transformers T1 and T2 may be reduced depending on the type of SST used, which could be any SST currently in existence or developed in the future.

In the example of FIG. 4, the phases 1-3 may be connected in any order. For example, when the first phase of the supplied power is connected to switch S1, switch S4 senses the available power in the first circuit ($P_1$-V) and shuts an "in-series" contact in each of the second phase circuit ($P_2$-V) and the third phase ($P_3$-V). When the second phase of the supplied power is connected to switch S2, switch S3 senses the available power and shuts a second "in-series" contact in the first circuit ($P_1$-V) and the third circuit ($P_3$-V). When the third phase of the supplied power is connected to switch S6, switch S8 senses the available power and shuts a third "in-series" contact in the second circuit ($P_2$-V) and the first circuit ($P_1$-V). At this point, current $I_1$ is free to flow to the load through switches S5 and contact S6 as described in regard to FIG. 3.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A high voltage alternating current power supply, comprising:
   a power output;
   a first low-voltage alternating current power receiving means that conducts a first current flow to a first electrical terminal;
   a second low-voltage alternating current power receiving means that conducts a second current flow, wherein the second current flow is not the first current flow; and
   a current isolation means connecting the second low-voltage alternating current power receiving means and a second electrical terminal, and isolating the first current flow from the second current flow.

2. The alternating current power supply of claim 1, wherein isolation means is a solid state transformer.

3. The alternating current power supply of claim 1, wherein the power output comprises a first output conductor and a second output conductor.

4. The alternating current power supply of claim 1, wherein the direction of the first current flow through the current isolation means is the same as the direction of the second current flow through the current isolation means.

5. The alternating current power supply of claim 1, wherein the second low-voltage alternating current power receiving means that conducts the second current flow is closed when a first low voltage power source is detected.

6. The alternating current power supply of claim 1, wherein the first current flows when a second low-voltage power source voltage is detected across the current isolation means and when the voltage at the output is greater than a predetermined minimum value.

7. The alternating current power supply of claim 1, wherein the phase of the first low voltage power source equals the phase of the second low voltage power source.

8. An alternating current power supply configured to provide a high-voltage alternating current power output resulting from a coupling of a first low-voltage alternating current power source providing a first voltage and a first current flow, and a second low-voltage alternating current power source providing a second voltage and a second current flow, the alternating current power supply comprising:
 a first low-voltage alternating current power input receiving the first voltage;
 a second low-voltage alternating current power input receiving the second voltage;
 a high-voltage alternating current power output having a first output conductor and a second output conductor having an output voltage between them equal to a phasor sum of the first voltage and the second voltage; and
 an isolation means inductively coupling the high voltage alternating current power output and the second low-voltage alternating current power input.

9. The alternating current power supply of claim 8, wherein the isolation means is a transformer.

10. The alternating current power supply of claim 8, wherein an output voltage of the isolation means is equal to a magnitude of the second voltage.

11. A voltage doubling power supply comprising:
 a first voltage input conductor receiving a first voltage at a first phase;
 a second voltage input conductor receiving a second voltage at a second phase; and
 a first and a second output conductor providing an output voltage equal to a sum of the first voltage and the second voltage, wherein only the second voltage input conductor is inductively connected to the second output conductor.

12. The voltage doubling power supply of claim 11, further comprising a first hot/neutral reversing switch and a second hot/neutral reversing switch.

13. The voltage doubling power supply of claim 12, further comprising a first voltage activated switch and a second voltage activated switch that are connected in series with the first and second hot/neutral reversing switches, respectively.

14. The voltage doubling power supply of claim 13, further comprising a switch coupled between the first and the second output conductor and in series with a voltage control element.

15. The voltage doubling power supply of claim 14, further comprising an isolation means connected in series between the second voltage activated switch and the second output conductor.

16. A voltage doubling power supply, comprising:
 a first low voltage circuit having a hot lead supplying a first current at a first low voltage to a load and a neutral lead returning said first current from the load;
 a second low voltage circuit having a hot lead providing a second current at a second low voltage to the primary side of a current isolation device and a neutral lead returning said second current from the isolation device, wherein the current isolation device generates an output voltage equal to the inverted polarity of the second low voltage to the load, wherein further the total voltage across the load is equal to a phasor summation of the first low voltage and the inverted polarity second low voltage.

* * * * *